Dec. 14, 1926.
J. M. DOWNER
1,610,758
SHAFT COUPLING OR THE LIKE
Filed June 10, 1924
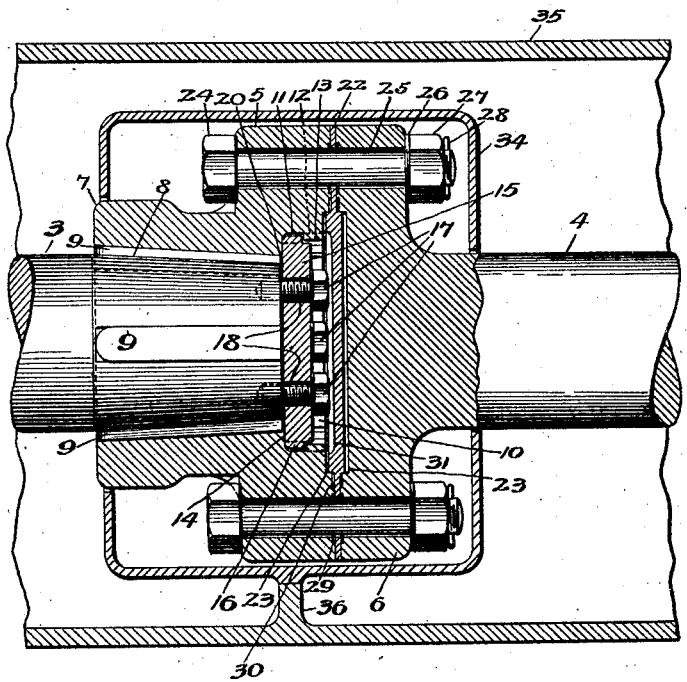
Inventor:
John M. Downer,
by *Alexander F. ...*
His Attorney.

Patented Dec. 14, 1926.

1,610,758

UNITED STATES PATENT OFFICE.

JOHN M. DOWNER, OF SCHENECTADY, NEW YORK, ASSIGNOR TO GENERAL ELECTRIC COMPANY, A CORPORATION OF NEW YORK.

SHAFT COUPLING OR THE LIKE.

Application filed June 10, 1924. Serial No. 719,216.

The present invention relates to devices for coupling together the adjacent ends of aligned shafts or the like, embodying a coupling member into which a shaft end is inserted and secured, and has for its object the provision of an improved arrangement in a coupling of the type above referred to, whereby said coupling member may be rigidly secured to the shaft end inserted therein and at the same time be easily removable therefrom.

For a consideration of what is believed to be novel and my invention, attention is directed to the accompanying drawing, the description of the embodiment of the invention illustrated therein, and the appended claims.

In the drawing, Fig. 1 is a longitudinal section of a shaft coupling embodying the invention, and Fig. 2 is an exploded view of the same in perspective, showing the details and relation of the various parts.

Referring to the drawing, 3 and 4 are shafts which are arranged in axial alignment for coupling and provided at their adjacent ends with flanged annular coupling members 5 and 6 respectively. Coupling member 5 is removable from shaft 3, being provided with a hub 7 which is centrally bored to seat with a drive fit on a tapered portion 8 at the end of said shaft. The taper permits the coupling member 5 to be easily removed to the right, as viewed in the drawing, after it is started from the seated position shown. Suitably spaced keys 9 are provided between the shaft 3 and coupling member 5 to lock them together against rotational stresses, according to the usual and well known practice.

The inner end of the bore, in which the tapered portion 8 of the shaft 3 is located, opens into a central enlarged counterbore or recess 10 in the face of the coupling member 5. An annular groove 11 is provided in the counterbore 10, and communicating with this groove are a plurality of spaced slots 12. This forms a plurality of inwardly projecting radial teeth 13. The teeth 13 and slots 12 are preferably of equal angular width.

The counterbore or recess 10 is of sufficient diameter, when enlarged by the groove 11, to provide an annular seat 14 about the bore in which shaft 3 is located for a removable retaining and jack plate 15 for the coupling member 5. This plate is of annular disk form and of such diameter that it will pass easily into or out of the recess 10. It is provided with radial teeth 16 on its periphery which are equal in number and angular spacing to the slots 12. The teeth 16 are of such width that they will easily pass through the slots 12 and are of such length that they lie in the groove 11 when the plate 15 is inserted within the recess 10.

The retaining and jack plate 15 is inserted within the counterbore 10 by passing the radial teeth 16 through the slots 12 and then rotating the plate 15 until the teeth 16 are moved in the groove 11 to a position in registration with and back of the teeth 13. This forms substantially a multiple bayonet joint between the plate 15 and the coupling member 5. The plate 15 may, in this position, be used to retain the coupling member in its seated position on the tapered end 8 of shaft 3, or it may be used to remove said member therefrom as will hereinafter appear.

To retain the coupling member 5 on said shaft end, the plate 15 is drawn toward the shaft end and against the annular seat 14 in said coupling member 5 by a number of retaining bolts 17 which pass through spaced openings 18 in said plate and thread into corresponding tapped holes 19 in the end of the shaft. When the bolts 17 are drawn up tightly, a slight clearance, as indicated at 20, remains between the end of the shaft and the plate 15 so that the latter exerts at all times a biasing or retaining action upon the seat 14 and thus retains coupling member 5 in place upon the shaft end.

To remove the coupling member 5 from the shaft 3, the retaining bolts 17 are removed and inserted in tapped holes, indicated at 21, which are spaced between openings 18 in the plate 15 and threaded to receive said bolts. The tapped holes 21 extend through the plate 15 and lie within a circle defined by the end of shaft 3 so that the bolts 17 on being tightened, or forced inwardly, meet the shaft end. Further tightening of the bolts serves to move the shaft and coupling member 5 longitudinally of the shaft in opposite directions through the engagement of teeth 16 of plate 15 with the teeth 13 of said coupling member. That is, the coupling member 5 is withdrawn longitudinally from its seated position on the shaft end by forcing the bolts 17 inwardly against said shaft end. Since the end of the shaft is tapered, a short movement of the coupling member 5 in this manner is sufficient to effect a separation or loosening of said member from its seated position, after which it may be easily withdrawn. However, in case the shaft should necessarily have no taper, it is evident that by the use of bolts of proper length, the coupling member 5 may be entirely withdrawn by them.

Thus it will be seen that the plate 15 is a combined retaining and jacking plate for the coupling member, being a retaining plate when bolts 17 are inserted in the openings 18 and drawn up in the tapped holes 19, and being a jacking plate when the bolts 17 are threaded into the tapped holes 21 into abutting relation with the end of the shaft. The teeth 13 and 16 are in operative contact and retain the plate 15 within the recess, when said plate is used as a jacking plate to remove or unseat the coupling member 5.

It should be noted from the foregoing description that the openings 18 in the plate 15 align with the tapped holes 19 in the shaft 3 only when the teeth 16 are in alignment with and back of teeth 13. Thus the teeth 13, openings 18, tapped holes 19 and teeth 16 bear a definite angular relation to each other which is established preferably by keying the coupling member 5 in the desired position on the shaft 3, inserting the retaining and jacking plate 15 in position within the recess 10 as before explained, then simultaneously drilling each opening 18 with its corresponding tapped hole 19 with the proper tap drill and afterward redrilling the openings 18 to a clearance size for the bolts 17 and tapping the holes 19. Other methods which accomplish the same result may, of course, be used.

The means embodying a retaining and jacking plate, herein shown and described in connection with the shaft coupling member 5 is applicable, as will be readily appreciated, to any similar member mounted on a shaft end and for this reason coupling member 5 may be taken as representing any like member or part similarly mounted on a body, such as a shaft, rod, stud or the like.

Coupling member 6 is here shown as a simple flange formed on the end of shaft 4 and represents any suitable coupling member. It may, if desired, be a duplicate of coupling member 5 with a like mounting and retaining means. The coupling members are separated and held in axial alignment by a shouldered spacing washer 22 which seats within an annular rabbet 23 in the face of each of said coupling members. The rabbets 23 are concentric with the common axial line of the shafts.

The coupling members 5 and 6 are operatively joined and drawn into abutting engagement with the spacing and aligning washer 22 by a plurality of coupling bolts 24 passed through axially parallel spaced bolt holes 25 in their opposed coupling flanges and provided each with a washer 26, a clamping nut 27 and a cotter pin 28 representing the usual and well known practice in joining flanged coupling members. The bolt holes 25 and annular rabbets 23 are provided with shallow relief counterbores, as indicated at 29 and 30 respectively in the coupling faces. The side of the spacing washer 22 which lies adjacent to the coupling member 5 is relieved as shown at 31, Fig. 1, to clear the heads of retaining bolts 17 when the coupling is fully assembled.

The spacing washer 22 is of such thickness between the flange faces of the coupling members, that when removed along with the coupling bolts 24, said coupling members are thereby separated sufficiently to permit the independent operation of the shafts in place. To remove the spacing washer 22, it is necessary, after removing the coupling bolts 24, to separate the coupling members sufficiently to permit the shoulders on said washer to clear the coupling faces, after which said spacing washer may be lifted or dropped out in a radial direction, depending upon the type of housing employed about the coupling.

In separating the coupling members 5 and 6 sufficiently to remove the spacing washer 22, advantage is taken of the fact that one or both of the shafts are usually movable axially, to a limited extent, by providing in one of the coupling members, preferably the one, if any, which is not axially movable, a plurality of tapped and counterbored holes 32 arranged in spaced axially parallel positions about the flange of said coupling member as indicated in the drawing in connection with the coupling member 5. The holes are counterbored for the major portion of their length, leaving short threaded portions 33 adjacent the flange face for receiving threaded jacking bolts (not shown) which are inserted from the rear through the counterbores. This arrangement facilitates inserting the jacking bolts since the threaded portions 33 are only of such length as insures a sufficient number of threads to carry the jacking load.

These bolts are omitted from the drawing for the reason that they are not part of the coupling and are used only to effect a separation of the coupling members when it is desired to remove the spacing washer 22. The bolts on being threaded into the holes 32 meet and force the spacing washer 22 to the right as viewed in the drawing. This carries the coupling member 6 and shaft 4 also to the right, thus effecting a separation of coupling member 6 from coupling member 5. When the separation between the opposite faces of the coupling members is finally sufficient to pass the greatest thickness of the spacing washer, the bolts may be withdrawn and the spacing washer removed. For the purpose of separating the coupling members, the holes 32 may of course, be located in either coupling member, although they are shown in connection with the member 5.

It will be seen that the extent to which either or both of the shafts 3 and 4 are axially movable must be equal to or slightly greater than the greatest thickness of the spacing washer 22. In the present example, the shaft 4 is considered as furnishing all of the axial separating movement while shaft 3 is rigidly held against axial movement. This is the condition which prevails in connection with well known turbogenerators, to which, as a coupling between the axially fixed turbine shaft and axially movable generator shaft, the present invention is particularly well adapted. Thus, in the present example, shaft 3 may be considered as a turbine shaft and shaft 4 as a generator shaft for a more complete understanding of the invention.

Referring more particularly to Fig. 1, the assembled coupling is shown within a protective housing comprising an inner casing 34 which closely surrounds said coupling and an outer casing 35 which supports the inner casing through a web 36 integral with said outer casing. The protective housing shown is the usual arrangement in connection with a turbogenerator and is shown only by way of example as one means for suitably enclosing the coupling.

In accordance with the provisions of the patent statutes, the principle of operation of the invention has herein been described, together with the apparatus which is now considered to represent the best embodiment thereof, but it should be understood that the apparatus shown is only illustrative, and that the invention may be carried out by other means.

What I claim as new and desire to secure by Letters Patent of the United States is:—

1. In combination, an annular flanged member having an axial bore extending therethrough, a body having an end portion which projects into the outer end of the bore, said member having an axially extending recess communicating with said bore, a plate in the recess, means for retaining the plate within the recess, said plate being movable in one direction to engage the retaining means and being movable in the opposite direction to engage the bottom of the recess, and means connected with the end portion of the body for moving the plate in either of said directions.

2. In combination, an annular flanged member having a hole extending therethrough, a shaft having an end portion which seats in the outer end of the hole to form a driving connection with said member, said hole being enlarged at its inner end to form a recess, a movable plate in the recess, a plurality of spaced teeth on the plate, a plurality of spaced teeth on the member, means for moving the plate toward the shaft end to hold the member thereon, and means for moving the plate away from the shaft end to bring the teeth thereon into engagement with the teeth on the member to move the member off the end of the shaft.

3. In combination, an annular flanged member having a hole extending therethrough, a shaft having an end portion which seats in the outer end of the hole to form a driving connection with the flanged member, said hole being enlarged at its inner end to form a recess, a movable plate in the recess, said plate having a plurality of spaced axially-parallel threaded holes extending through it, a plurality of spaced teeth on the plate, a plurality of spaced teeth on the member, and a plurality of threaded bolts carried by the plate which in one position thread into spaced openings in the shaft end for moving the plate toward said shaft end to hold the member thereon, and which bolts in another position thread through said threaded holes in the plate and into abutting relation with the shaft end for moving the plate away from the shaft end to bring its teeth into engagement with the teeth on the member to move the member off the end portion of the shaft.

4. In combination, an annular flanged member, a shaft having an end portion on which said member is seated, a recess in the flanged member, a movable plate in the recess, means connected with the shaft end for moving the plate to a seated position in the bottom of the recess whereby the flanged member is retained in its seated position on the end portion of the shaft, said means being operative to move the plate in the opposite direction, and means forming a connection between the plate and the member whereby the flanged member is moved from its seated position on the end portion of the shaft when the plate is moved in said opposite direction.

5. In a shaft coupling, the combination with a shaft and a coupling member having a central longitudinal bore wherein at one end one end of said shaft is seated and an enlarged cylindrical recess formed at the opposite end of the bore coaxially therewith, of a circular flat plate seated within said recess in spaced parallel relation to the shaft end, said plate having a plurality of threaded holes arranged in spaced relation to each other in registration with said shaft end, a plurality of interlocking radial teeth on the periphery of the plate and within the recess forming a multiple bayonet joint between said plate and the coupling member, and means carried by the plate and connected with said shaft end for holding the plate in said seated position in the recess.

6. In a shaft coupling, the combination with a shaft, of a coupling member mounted thereon, said member having a cylindrical recess of greater diameter than the shaft formed therein with one end adjacent and in communication with the shaft end, means forming an annular seat at said end of the recess, said seat lying in a plane at right angles to the shaft axis and in spaced relation to the shaft end, a plurality of inwardly projecting radial teeth carried by the coupling member and spaced about the opposite end of the recess, said teeth lying in a plane which is parallel with the plane of the annular seat in said recess, a circular plate which lies in said recess, said plate having a plurality of threaded holes extending through it in spaced relation to each other and in registration with the shaft end, a plurality of radial teeth on the periphery of the plate which lie between said first-named teeth and the annular seat, and means carried by the plate operatively connected with the shaft end for holding said plate against the annular seat.

7. In a shaft coupling, the combination with a shaft and a coupling member mounted on the end of said shaft, said member having a central cylindrical recess coaxial with and in extension of the shaft end therein, of means providing an annular flat seat at the end of said recess adjacent the shaft end, said seat lying in a plane at right angles to the axis of the shaft and being axially spaced in advance of the shaft end, a plurality of inwardly projecting radial teeth equally spaced about the recess adjacent its opposite end whereby is formed a radial groove between said teeth and the annular seat and radial slots between said teeth communicating with the groove, a circular plate which lies within the recess in contact with the annular seat, said plate having a plurality of axially parallel threaded holes spaced about said plate in registration with the shaft end, a plurality of radial teeth on the periphery of the plate which lie in the groove in registration with the inwardly projecting teeth about the recess, and a plurality of retaining bolts by which the plate is secured to the shaft end.

8. In combination, a mechanical connector member having a socket in one end, a body having an end portion which projects into said socket, said member having a recess communicating with the socket, a plate in the recess, means for retaining the plate within the recess, said plate being movable in one direction to engage the retaining means and being movable in the opposite direction to engage the bottom of the recess, and means connected with the end portion of the body for moving the plate in either of said directions.

9. In combination, a mechanical connector member having a socket in one end, a body having an end portion which seats in the socket to form a connection with the member, said socket being enlarged at its inner end to form a recess, a movable plate in the recess, a plurality of spaced teeth on the plate, a plurality of spaced teeth on the member, means for moving the plate toward the shaft end to hold the member thereon, and means for moving the plate away from the shaft and to bring the teeth thereon into engagement with the teeth on the member to move the member off the end of the shaft.

In witness whereof, I have hereunto set my hand this 9th day of June, 1924.

JOHN M. DOWNER.